(12) United States Patent
Agustin

(10) Patent No.: US 10,416,540 B2
(45) Date of Patent: Sep. 17, 2019

(54) DISPLAY CONTROL APPARATUS, IMAGE PROJECTION SYSTEM, AND CONTROL METHOD

(71) Applicant: CANON KABUSHIKI KAISHA, Tokyo (JP)

(72) Inventor: Rowelito Agustin, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/239,664

(22) Filed: Jan. 4, 2019

(65) Prior Publication Data
US 2019/0219903 A1    Jul. 18, 2019

(30) Foreign Application Priority Data

Jan. 17, 2018 (JP) ................................ 2018-005944

(51) Int. Cl.
| | |
|---|---|
| *H04N 9/31* | (2006.01) |
| *H04N 5/74* | (2006.01) |
| *G03B 21/13* | (2006.01) |
| *G06F 3/14* | (2006.01) |

(52) U.S. Cl.
CPC ............ *G03B 21/13* (2013.01); *G06F 3/1446* (2013.01); *H04N 5/7441* (2013.01); *H04N 9/3147* (2013.01); *H04N 2005/745* (2013.01)

(58) Field of Classification Search
CPC ...... H04N 9/3147; H04N 9/3185; H04N 9/31; H04N 9/28; H04N 2005/745; H04N 5/7441; G06F 3/1446; G03B 21/147
USPC ..... 348/745–747, 806, 383; 345/40, 1.3, 42; 353/30, 34, 69, 70, 94
See application file for complete search history.

(56) References Cited

U.S. PATENT DOCUMENTS

| | | | |
|---|---|---|---|
| 6,222,593 B1 | 4/2001 | Higurashi et al. | |
| 2016/0094821 A1* | 3/2016 | Mori | H04N 9/3185 |
| | | | 348/745 |
| 2016/0162246 A1* | 6/2016 | Ouchi | G06F 3/1431 |
| | | | 345/1.3 |
| 2018/0013995 A1 | 1/2018 | Mizushiro | |

FOREIGN PATENT DOCUMENTS

JP     2018-005018 A    1/2018

\* cited by examiner

*Primary Examiner* — Sherrie Hsia
(74) *Attorney, Agent, or Firm* — Venable LLP

(57) ABSTRACT

A display control apparatus comprises a setting unit that sets a target overlap width with respect to an overlap region, in which at least two of adjacent projection images of a plurality of projection images projected by a plurality of projection devices overlap each other, an image obtaining unit that obtains a captured image obtained by capturing the plurality of projected projection images, a calculation unit that calculates the overlap width of the overlap region of the at least two adjacent projection images on the basis of the captured image, and an indicator generation unit that generates, on the basis of the overlap width, an adjustment indicator that guides a positional adjustment of the projection image such that the at least two adjacent projection images overlap each other by the target overlap width.

20 Claims, 13 Drawing Sheets

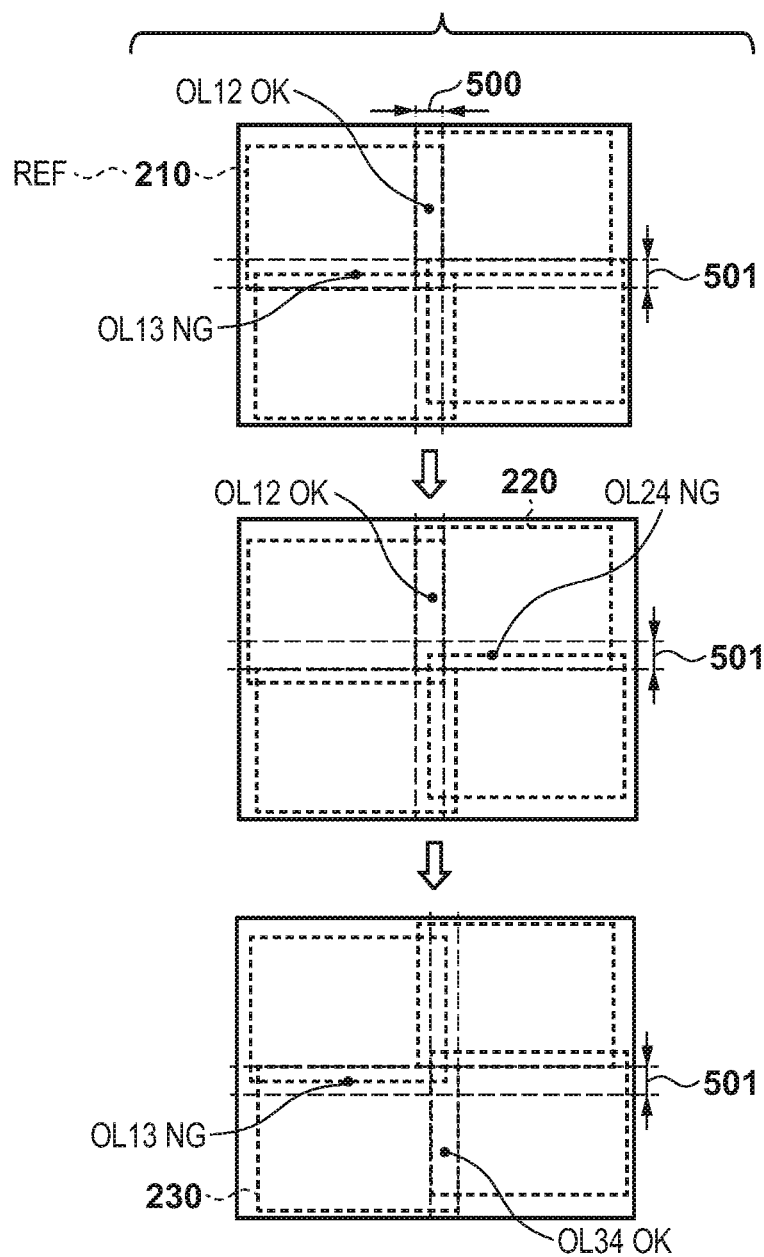

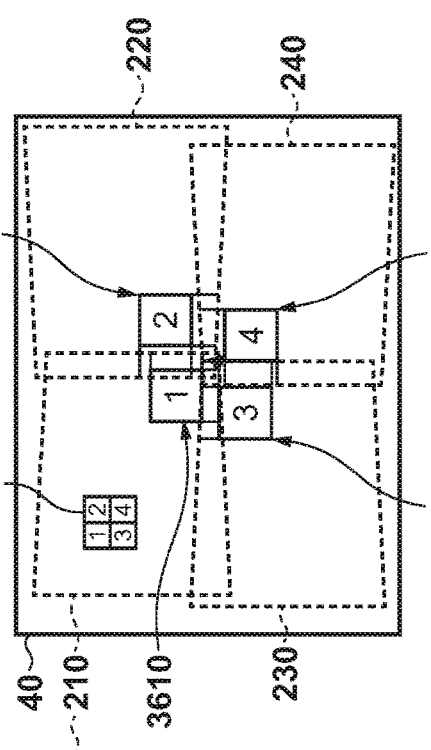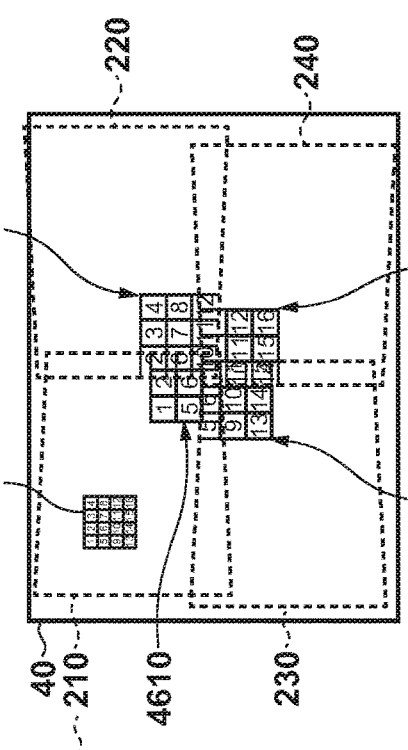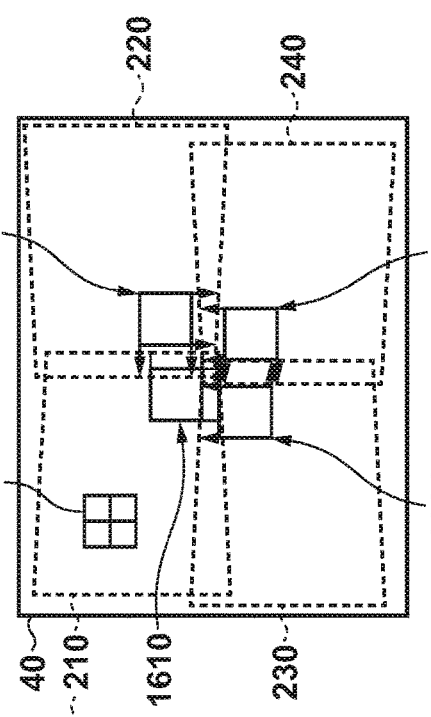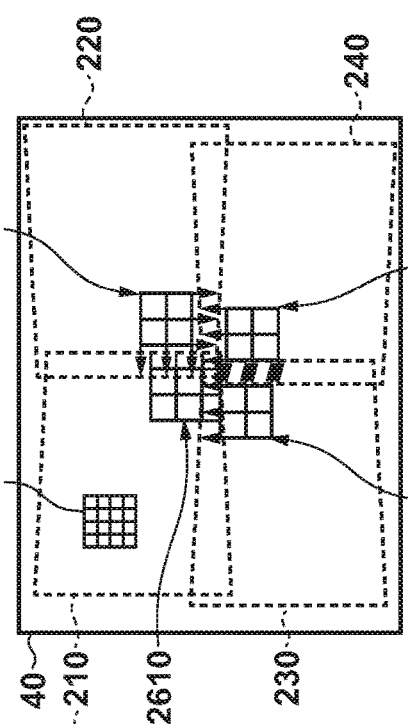

DISPLAY CONTROL APPARATUS, IMAGE PROJECTION SYSTEM, AND CONTROL METHOD

BACKGROUND OF THE INVENTION

Field of the Invention

The present invention relates to a positional adjustment of a plurality of projection images projected by a plurality of projection devices.

Description of the Related Art

There is a technology that displays a single image using a plurality of projectors. In U.S. Pat. No. 6,222,593, an image projection system is disclosed that displays a single image using a plurality of projectors. In this system, a single image is projected onto a screen by combining a personal computer, a plurality of projectors, and a controller unit that divides a high definition input image and outputs an image signal to each of the projectors.

In such an image projection system, edge blending is used as one method of smoothly displaying a joint line between the images adjacent to each other. In order to perform the edge blending, an overlap width needs to be provided between every image, in which adjacent images overlap each other.

In order to accurately project the single image using the plurality of projectors, it is necessary to adjust the positions of projector main bodies, but it is extremely difficult for users to visually perform the positional alignment of the projectors for the edge blending, while taking into account overlap conditions.

SUMMARY OF THE INVENTION

An object of an embodiment of the present invention is to enable a user to easily project a single image using a plurality of projectors.

According to one aspect of the present invention, there is provided a display control apparatus that displays a single image by causing a plurality of projection images projected in a projection target region by a plurality of projection devices arranged in different positions to overlap each other by a predetermined overlap width, the display control apparatus comprising: a setting unit configured to set a target overlap width with respect to an overlap region, in which at least two of adjacent projection images of the plurality of projection images overlap each other; an image obtaining unit configured to obtain a captured image obtained by capturing the plurality of projection images projected in the projection target region; a calculation unit configured to calculate the overlap width of the overlap region of the at least two adjacent projection images on the basis of the captured image; and an indicator generation unit configured to generate, on the basis of the overlap width, an adjustment indicator that guides a positional adjustment of the projection image such that the at least two adjacent projection images overlap each other by the target overlap width.

According to another aspect of the present invention, there is provided an image projection system comprising: a plurality of projection devices arranged in different positions; an image capturing device configured to capture a plurality of projection images projected in a projection target region by the plurality of projection devices; a setting unit configured to set a target overlap width with respect to an overlap region in which at least two of adjacent projection images of the plurality of projection images overlap each other; an image obtaining unit configured to obtain a captured image obtained by capturing the plurality of projection images projected in the projection target region; a calculation unit configured to calculate the overlap width of the overlap region of the at least two adjacent projection images on the basis of the captured image; and an indicator generation unit configured to generate, on the basis of the overlap width, an adjustment indicator that guides a positional adjustment of the projection image such that the at least two adjacent projection images overlap each other by the target overlap width.

According to another aspect of the present invention, there is provided a control method for a display control apparatus that controls to display a single image by causing a plurality of projection images projected in a projection target region by a plurality of projection devices arranged in different positions to overlap each other by a predetermined overlap width, the control method comprising: setting a target overlap width with respect to an overlap region in which at least two of adjacent projection images of the plurality of projection images overlap each other; obtaining a captured image obtained by capturing the plurality of projection images projected in the projection target region; calculating the overlap width of the overlap region of the at least two adjacent projection images on the basis of the captured image; and generating, on the basis of the overlap width, an adjustment indicator that guides a positional adjustment of the projection image such that the at least two adjacent projection images overlap each other by the target overlap width.

According to another aspect of the present invention, there is provided a non-transitory computer readable storage medium that stores a program causing a computer to execute a control method for a display control apparatus that displays a single image by causing a plurality of projection images projected in a projection target region by a plurality of projection devices arranged in different positions to overlap with each other by a predetermined overlap width, the control method comprising: setting a target overlap width with respect to an overlap region in which at least two of adjacent projection images of the plurality of projection images overlap each other; obtaining a captured image obtained by capturing the plurality of projection images projected in the projection target region; calculating the overlap width of the overlap region of the at least two adjacent projection images on the basis of the captured image; and generating, on the basis of the overlap width, an adjustment indicator that guides a positional adjustment of the projection image such that the at least two adjacent projection images overlap each other by the target overlap width.

Further features of the present invention will become apparent from the following description of exemplary embodiments with reference to the attached drawings.

BRIEF DESCRIPTION OF THE DRAWINGS

FIG. 7A to FIG. 7D are diagrams for describing a step for determining a reference projector.

FIG. 9A to FIG. 9D are diagrams each illustrating an example of an adjustment indicator according to a second embodiment.

DESCRIPTION OF THE EMBODIMENTS

Figure 1:
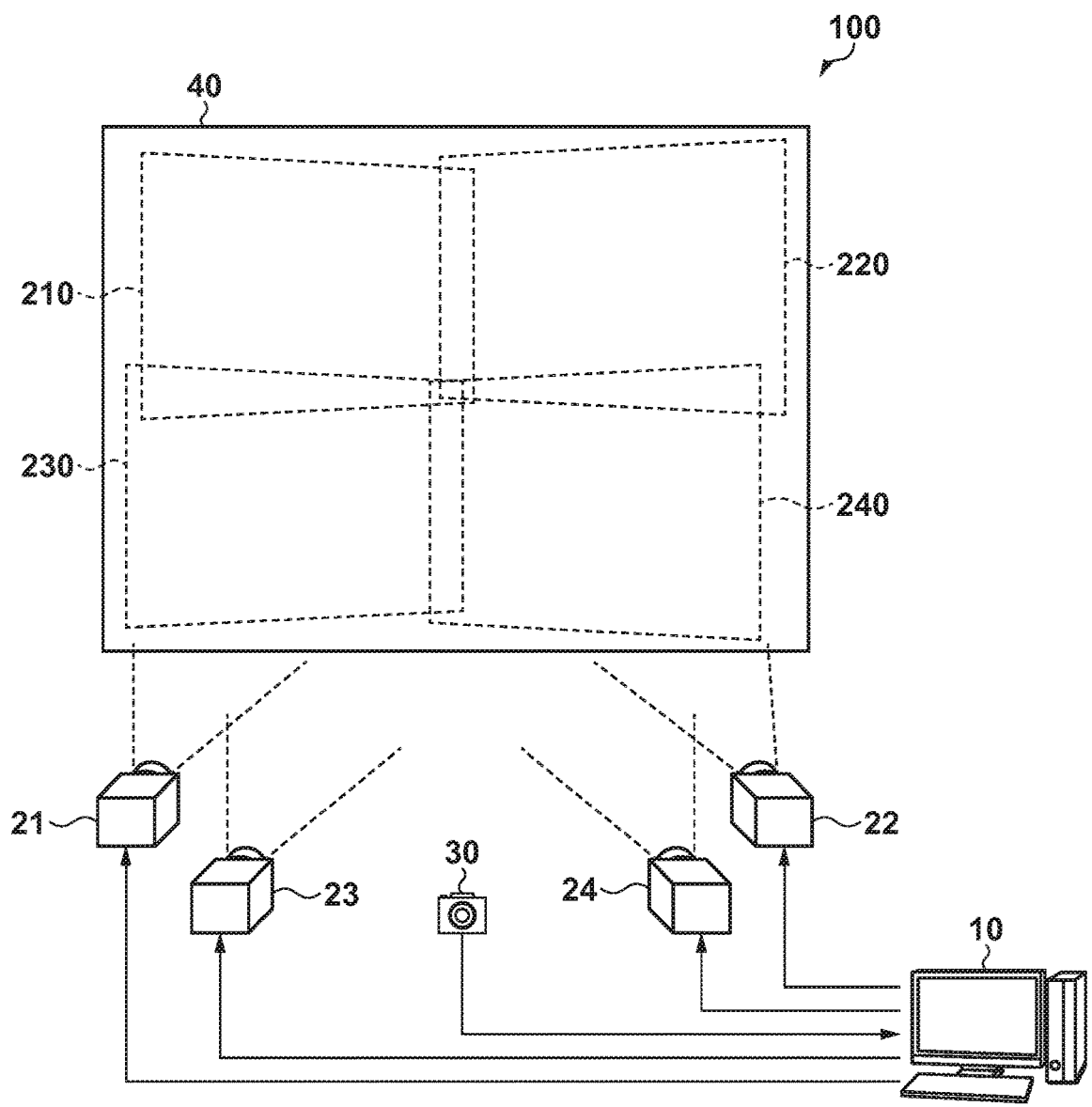
FIG. 1 is a configuration diagram illustrating an example of an image projection system 100.

Embodiments according to the present invention are described in detail below with reference to the drawings. Note that configurations illustrated in the following embodiments are merely examples, and the present invention is not limited to those configurations illustrated. Further, in all of the drawings that describe the embodiments, the same reference numerals are assigned to common constituent elements, and repeated descriptions of the common constituent elements are omitted.

First Embodiment

FIG. 1 is a configuration diagram illustrating an example of an image projection system 100 according to a first embodiment. The image projection system 100 is provided with a personal computer 10 (hereinafter referred to as PC 10), projectors 21 to 24, a camera 30, and a screen 40.

The PC 10 is an example of a display control apparatus, and generates each of images projected by the projectors 21 to 24 onto the screen 40, which is a projection target region. The projectors 21 to 24 are each an example of a projection device, and respectively project projection images 210 to 240 generated by the PC 10. In FIG. 1, the projection images 210 to 240 are projected onto the screen 40 so as to form a matrix pattern. Here, the projection images 210 to 240 are adjusted such that each of the projection images 210 to 240 has the same size. Further, the projectors 21 to 24 are arranged in different positions from one another, and a user can move the position of each of the projection images by moving each of the projectors to a desired position. Note that the present embodiment is described using an example in which the four projectors are provided, but the number of the projectors is not limited to four.

The camera 30 is an example of an image capturing device, captures an image projected by the projectors 21 to 24 onto the screen 40, and transmits the image to the PC 10. The screen 40 is an example of the projection target region, onto which an image is projected by the projectors 21 to 24.

The image projection system 100 according to the first embodiment projects a single image onto the screen 40 by using the projectors 21 to 24. When performing the projection, the PC 10 presents to the user an adjustment indicator that guides a positional adjustment of each of the projection images, such that each of the projection images satisfies a requirement for an overlap width for edge blending (hereinafter referred to as an overlap requirement). In this Specification, as described above, the positional adjustment of the projection image is performed by moving each of the projectors, but as long as the overlap requirement for the edge blending is satisfied, the position of the projection image may be adjusted in any manner.

Figure 2:
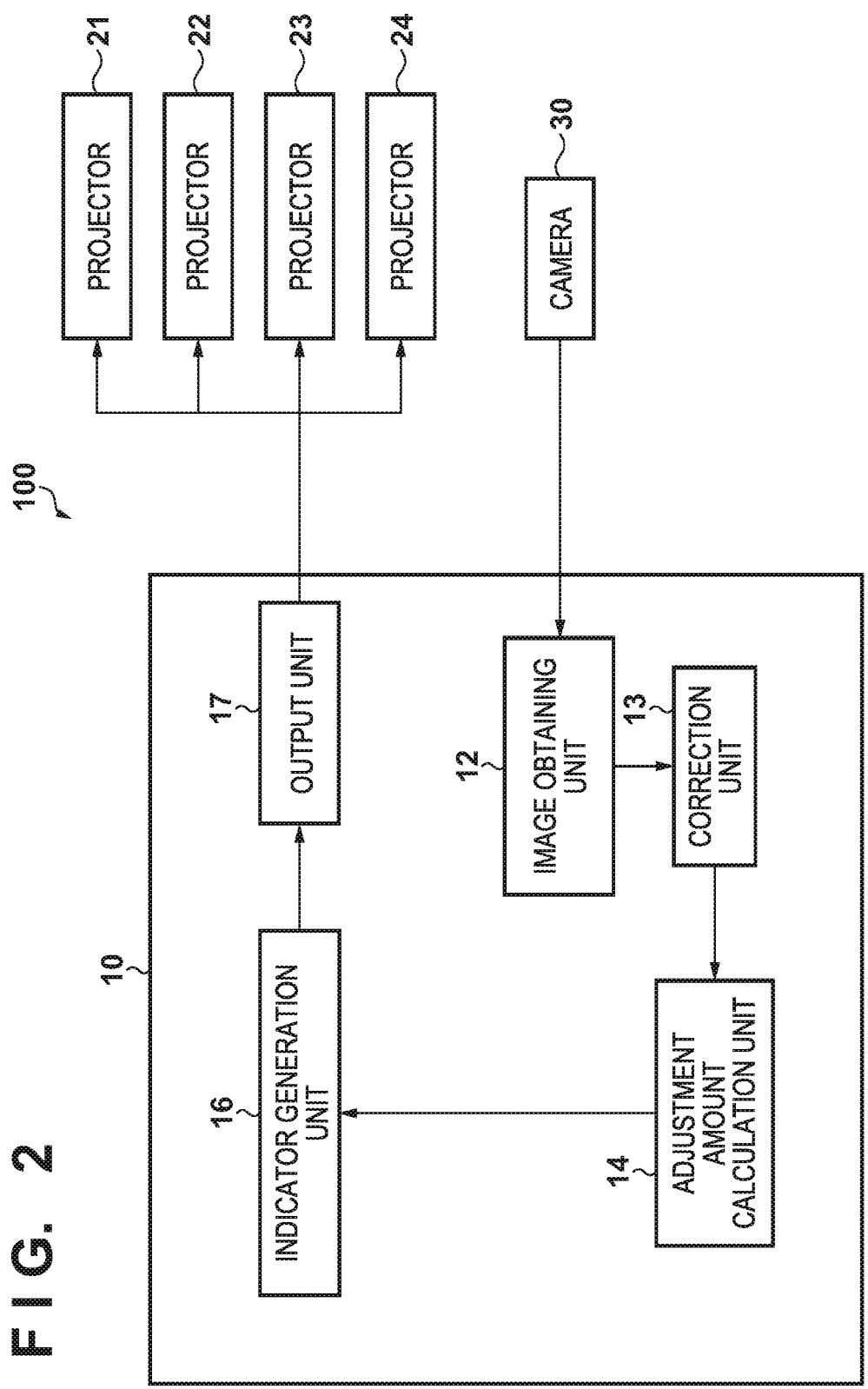
FIG. 2 is a functional block diagram of a PC 10.

FIG. 2 is a functional block diagram of the PC 10. The PC 10 is provided with an image obtaining unit 12, a correction unit 13, an adjustment amount calculation unit 14, an indicator generation unit 16, and an output unit 17.

The image obtaining unit 12 obtains the image captured by the camera 30. The correction unit 13 performs correction of projection images using the image obtained by the image obtaining unit 12. In general, there are cases in which an image displayed on a screen is distorted to a trapezoidal shape due to a relative positional relationship between the projector and the screen. The correction unit 13 according to the first embodiment performs keystone correction so as to correct the trapezoidal distortion, but as long as the distortion of the projection image is corrected, any processing may be performed.

On the basis of the corrected image, the adjustment amount calculation unit 14 calculates horizontal and/or vertical directions and distances, based on which the projector is moved so as to satisfy the overlap requirement. A method of calculating the movement direction and distance is described below.

The indicator generation unit 16 obtains, from the adjustment amount calculation unit 14, the direction and distance, based on which the projector is adjusted, namely, moved to a correct position, such that each of the projection images satisfies the overlap requirement, and generates an adjustment indicator (to be described in detail with reference to FIG. 4A to FIG. 4C) such that the user can visually recognize the direction and distance.

The output unit 17 outputs the adjustment indicator generated by the indicator generation unit 16 to the projectors 21 to 24. Each of the projectors 21 to 24 projects the adjustment indicator on the screen 40.

Note that, in the present embodiment, the projectors 21 to 24 project the adjustment indicator such that the adjustment indicator is superimposed on the images generated by an image generation unit (not illustrated) of the PC 10. However, the projected images are not necessarily generated by the PC 10, and may be input to each of the projectors 21 to 24 from a device separate from the PC 10 that generates the adjustment indicator.

Figure 3:
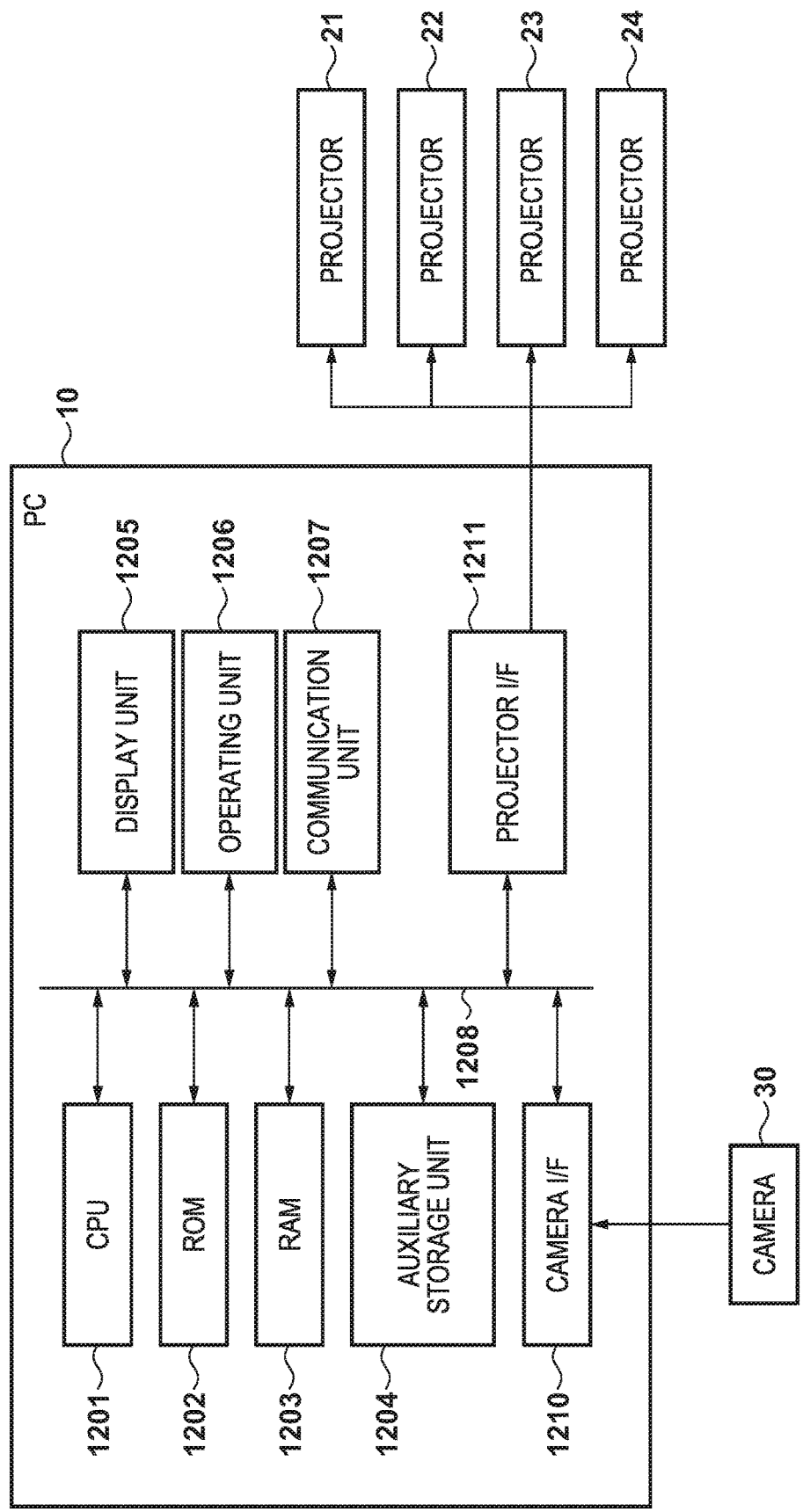
FIG. 3 is a block diagram illustrating a hardware configuration of the PC 10.

FIG. 3 is a block diagram illustrating a hardware configuration of the PC 10. The PC 10 is provided with a CPU 1201, a ROM 1202, a RAM 1203, an auxiliary storage unit 1204, a display unit 1205, an operating unit 1206, a communication unit 1207, a bus 1208, a camera I/F 1210, and a projector I/F 1211.

The CPU 1201 performs overall control of the PC 10 by using computer programs and data that are stored in the ROM 1202 and the RAM 1203. For example, each of the functions of the PC 10 illustrated in FIG. 2 can be realized by the CPU 1201 executing a predetermined computer program. Note that part or all of each of the functions of the PC 10 illustrated in FIG. 2 may be realized by predetermined hardware. The ROM 1202 stores programs and parameters that do not require any changes. The RAM 1203 temporarily stores programs and data supplied from the auxiliary storage unit 1204, data supplied from the outside via the communication unit 1207, and the like. The auxiliary storage unit 1204 is configured by a hard disk drive or the like, for example, and stores content data such as still images and moving images.

The display unit 1205 is configured by a liquid crystal display or the like, for example, and displays a graphical user interface (GUI) that is used by the user to operate the PC 10, and the like. The operating unit 1206 is configured by a keyboard, a mouse, and the like, for example, and inputs various instructions to the CPU 1201 in response to operations by the user. The communication unit 1207 performs communication with an external device. The bus 1208 transmits information by connecting each component of the PC 10.

The camera I/F 1210 is an interface for connecting the camera 30 with the PC 10. The projector I/F 1211 is an interface for connecting the projectors 21 to 24 with the PC 10.

Figure 4A:
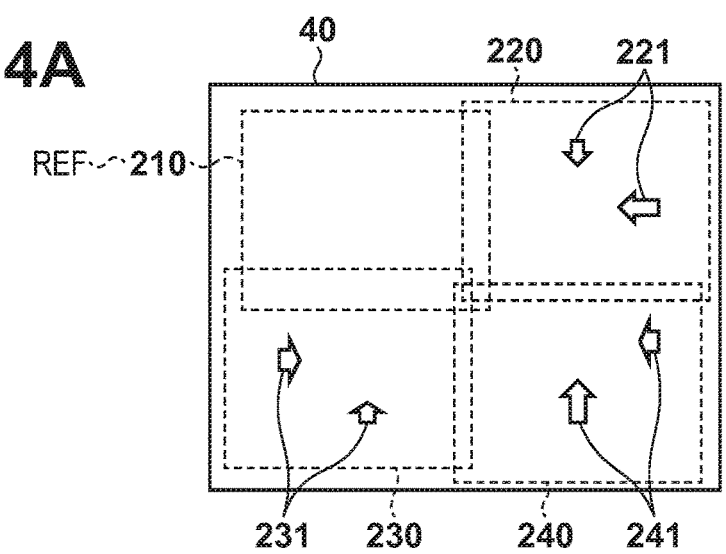
FIG. 4A to FIG. 4C are diagrams for describing adjustment indicators according to a first embodiment.
Figure 4B:
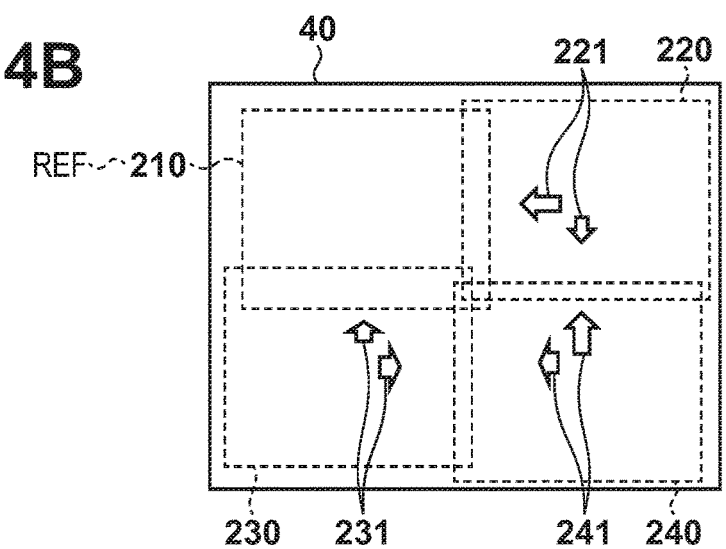
Figure 4C:
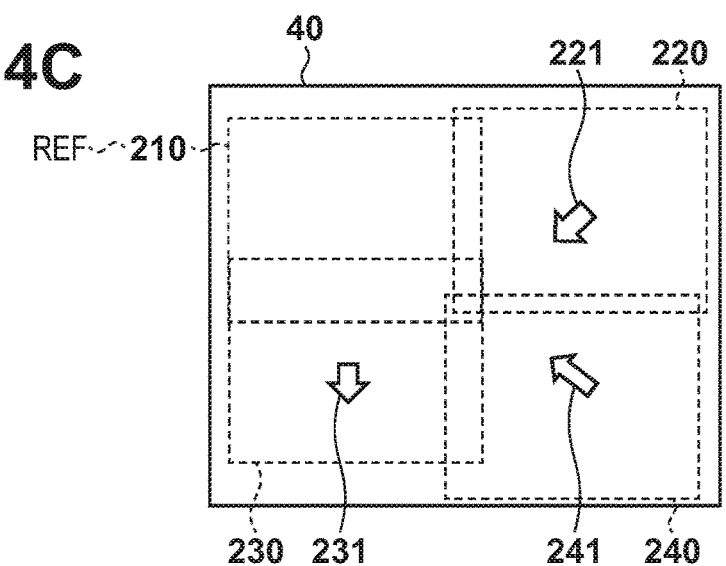

FIG. 4A to FIG. 4C are diagrams for describing the adjustment indicator according to the first embodiment. In FIG. 4A to FIG. 4C, the projection images 210 to 240, on which the keystone correction has been performed and which are projected by the projectors 21 to 24, are displayed on the screen 40. Further, in these examples, the projector 21 that projects the projection image 210 is selected as a reference projector that is used as a directional reference when moving the other projectors. Adjustment indicators 221, 231, and 241 respectively indicate adjustment amounts (in which directions and to what extents the projectors need to be moved for the positional alignment) for the projectors 22, 23, and 24 with respect to the projector 21. In the examples in FIG. 4A and FIG. 4B, arrows in the horizontal direction and the vertical direction are displayed, but as long as a horizontal component and a vertical component of the adjustment can be presented, the adjustment indicator may be displayed in any manner or in any direction, as illustrated in the example in FIG. 4C.

Figure 5A:
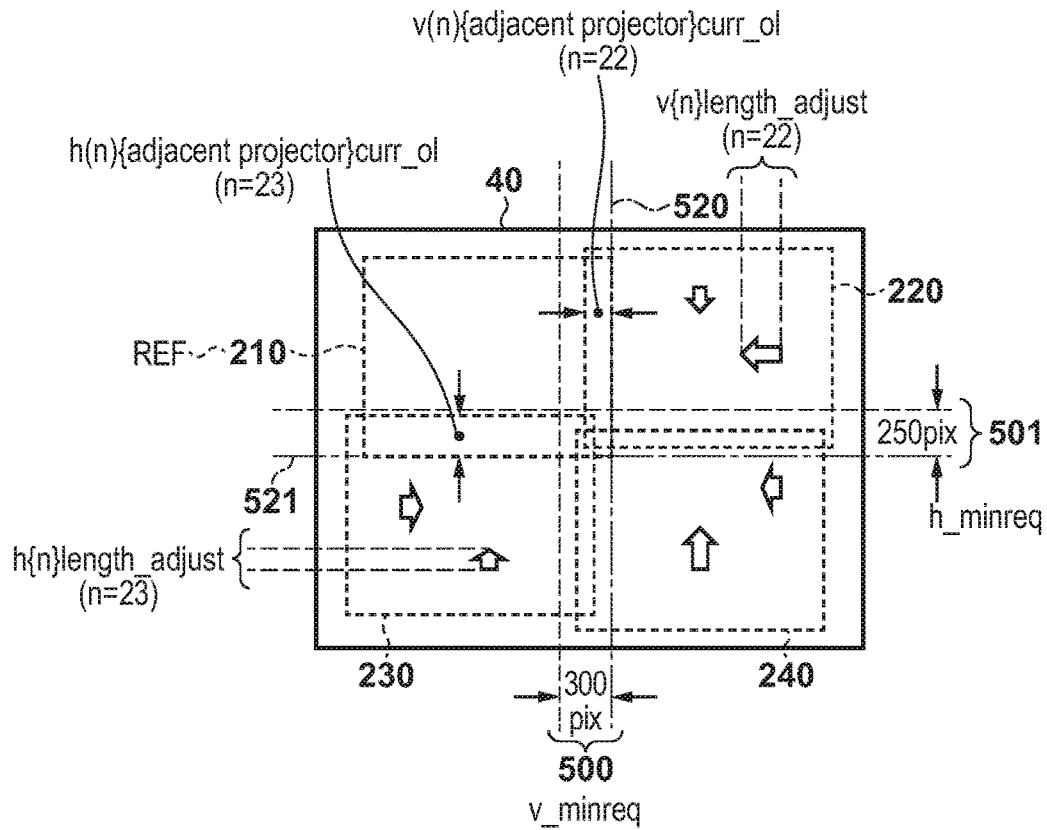
FIG. 5A and FIG. 5B are diagrams for describing adjustment amounts.
Figure 5B:
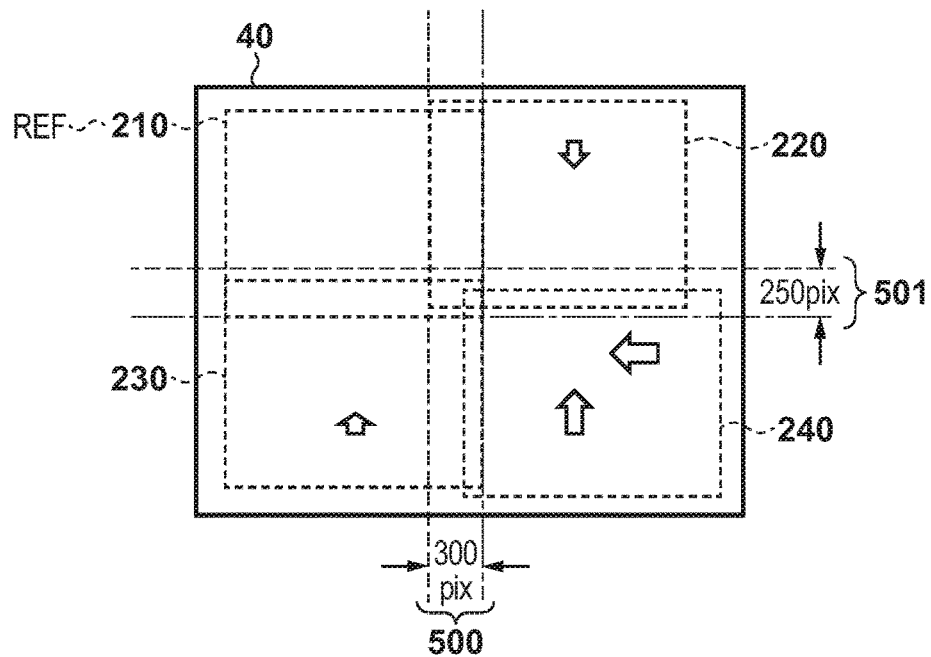

FIG. 5A and FIG. 5B are diagrams for describing the adjustment amount. In FIG. 5A and FIG. 5B, predetermined overlap widths 500 and 501 are set for the edge blending. Specifically, a width v_minreq and a width h_minreq (overlap requirements) are determined in pixel units for overlap portions in the horizontal (left and right) direction and the vertical (up and down) direction of the projection images, on which the keystone correction has been performed, with respect to each of projector image sizes obtained before the keystone correction. For example, when the projector image size is WUXGA (1920 x 1200), in FIG. 5A and FIG. 5B, the overlap width 500 (v_minreq) is set to be 300 pix with respect to 1920 pix, and the overlap width 501 (h_minreq) is set to be 250 pix with respect to 1200 pix. Positional alignment is performed such that the projection images overlap each other while satisfying the overlap widths (overlap requirements).

Here, when the projector 21 that projects the projection image 210 is the reference projector, a region that satisfies the overlap requirements (a region extending by v_minreq from a reference line 520 overlapping with the right side of the reference projection image 210 and extending by h_minreq from a reference line 521 overlapping with the bottom side of the projection image 210) is determined. Hereinafter, this cross-shaped region is referred to as an overlap requirement region.

Distances between the reference lines 520 and 521 and sides of each of the projection images corresponding to the reference lines 520 and 521 are defined, namely, as illustrated in FIG. 5A, a current distance between the reference line 520 and a side in the vertical (up and down) direction of the image projected by a projector n is defined as v(n){adjacent projector}curr_ol, and a current distance between the reference line 521 and a side in the horizontal (left and right) direction of the image is defined as h(n){adjacent projector}curr_ol. Then, with respect to v(n){adjacent projector}curr_ol and h(n){adjacent projector}curr_ol, a direction that causes the projection images to overlap each other is defined as a positive direction, and a direction that causes the projection images not to overlap with each other is defined as a negative direction.

Then, an adjustment length (distance), by which each of the projectors 22 to 24 needs to be moved with respect to the reference projection image 210, is calculated in the following manner.

Adjustment length of the vertical (up and down) direction: |h{n}length_adjust|=h_minreq−h(n){adjacent projector}curr_ol Adjustment length of the horizontal (left and right) direction: |v{n}length_adjust|=v_minreq−v(n){adjacent projector}curr_ol Note that n is equal to 22, 23, and 24. Here, when h{n}length_adjust and v{n}length_adjust are positive values, the adjustment direction in which the projection image is moved is a direction that causes the overlap portion to be increased. On the other hand, when they are negative values, the orientation of the adjustment direction is a direction that causes the overlap portion to be decreased.

FIG. 5B is an example illustrating the projection images different from those in FIG. 5A and the adjustment amounts thereof The adjacent projection images 210 and 220 overlap each other so as to satisfy the overlap width 500. Thus, there is no need to adjust the projection image 220 in the horizontal direction, so the adjustment indicator in the horizontal direction is not displayed on the projection image 220.

Further, the projection image 230 adjacent to the projection image 210 is positioned so as to satisfy the overlap width 500. Thus, there is no need to adjust the projection image 230 in the horizontal direction, so the adjustment indicator in the horizontal direction is not displayed on the projection image 230.

Figure 6:
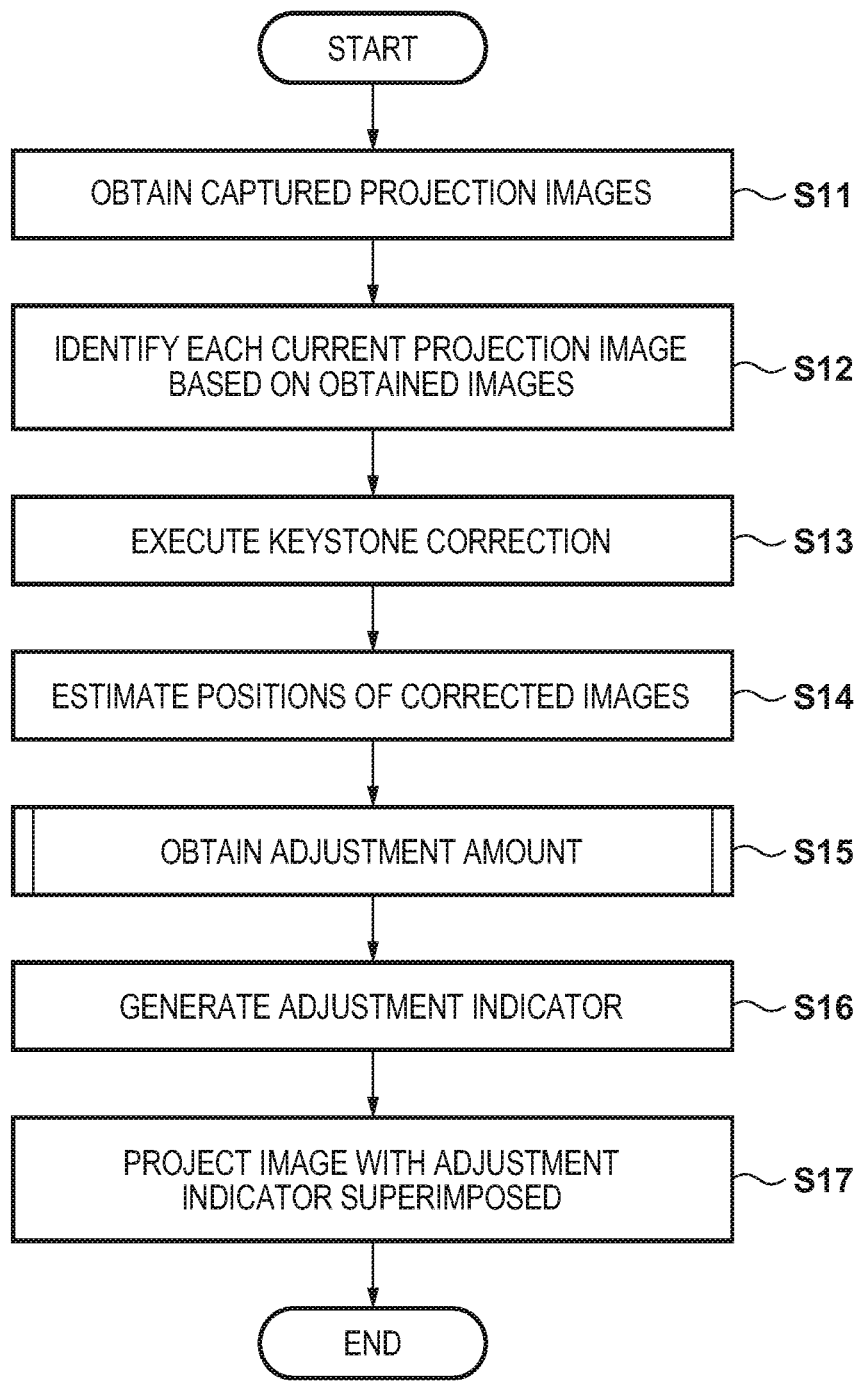
FIG. 6 is a flowchart illustrating processing for determining the adjustment amounts according to the first embodiment.

FIG. 6 is a flowchart illustrating processing for determining the adjustment amount. The processing illustrated in FIG. 6 starts at a timing when the PC 10 receives an instruction for the positional alignment from the user. Further, the processing illustrated in FIG. 6 is realized by the CPU 1201 of the PC 10 loading a program, which is stored in the ROM 1202, in the RAM 1203 and executing each of the functional blocks (see FIG. 2).

In step S11, the image obtaining unit 12 obtains individually the images captured by the camera 30 and projected onto the screen 40. As long as the position of each of the projection images on the screen 40 can be identified, any image may be used. In step S12, the correction unit 13 identifies, from the obtained image, each of the projection images that are currently being projected. Next, in step S13, the correction unit 13 performs the keystone correction on each of the projection images. In step S14, on the basis of the captured images obtained in step S11 and the images on which the keystone correction has been performed, the correction unit 13 estimates projection positions of the corrected images on the screen. Here, the image generation unit (not illustrated) of the PC 10 may cause each of the projectors to project the images on which the keystone correction has been performed.

In step S15, the adjustment amount calculation unit 14 calculates the adjustment direction and the adjustment length. This processing is described in detail with reference to FIG. 7A to FIG. 7D, FIG. 8A and FIG. 8B.

In step S16, the indicator generation unit 16 generates the adjustment indicator on the basis of the adjustment direction and the adjustment length calculated in step S15.

In step S17, the output unit 17 outputs an image to each of the projectors such that the generated adjustment indicator is displayed on the screen 40 while being superimposed on the projection image that has already been projected. For example, after depicting the adjustment indicator in the image to be projected and performing the keystone correction thereon, the output unit 17 outputs the image to the projector.

Next, using FIG. 7A to FIG. 7D, FIG. 8A, and FIG. 8B, the step for calculating the adjustment amount (step S15) is described. In this step, first of all, among each of the projectors, a reference projector is determined. Then, with respect to the projection image projected by the reference projector, the adjustment amount is calculated that indicates in which direction and to what extent each of the projection images is moved. More specifically, an overlap requirement region is determined along the side in the vertical direction and the side in the horizontal direction of the reference projection image projected by the reference projector. Next, the adjustment amount is calculated on the basis of the positions of the other projection images with respect to the overlap requirement region.

Figure 7A:
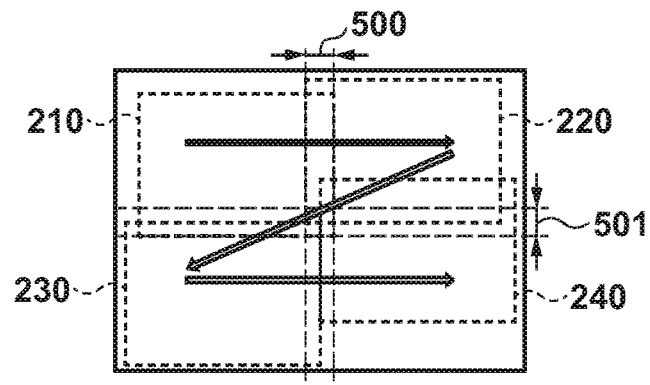

FIG. 7A to FIG. 7D are diagrams for describing a step for determining a reference projector. FIG. 7A illustrates the projection images 210 to 240 on which the keystone correction has been performed, and the overlap requirement region having the overlap widths 500 and 501. As a procedure for determining a reference projector, first of all, it is checked whether the overlap portion of each of the projection images satisfies the overlap requirements (overlap widths 500 and 501). Here, on the basis of the position of each of the images estimated in step S13 in FIG. 6, the top-left projection image 210, the top-right projection image 220, the bottom-left projection image 230, and the bottom-right projection image 240 are scanned, in this order, to be checked. Then, in a case where there is any projection image that includes the overlap portions in the horizontal direction and the vertical direction, namely, both of the overlap portions that satisfy the overlap requirements, the projector that projects this projection image is determined to be a reference projector.

Figure 7B:
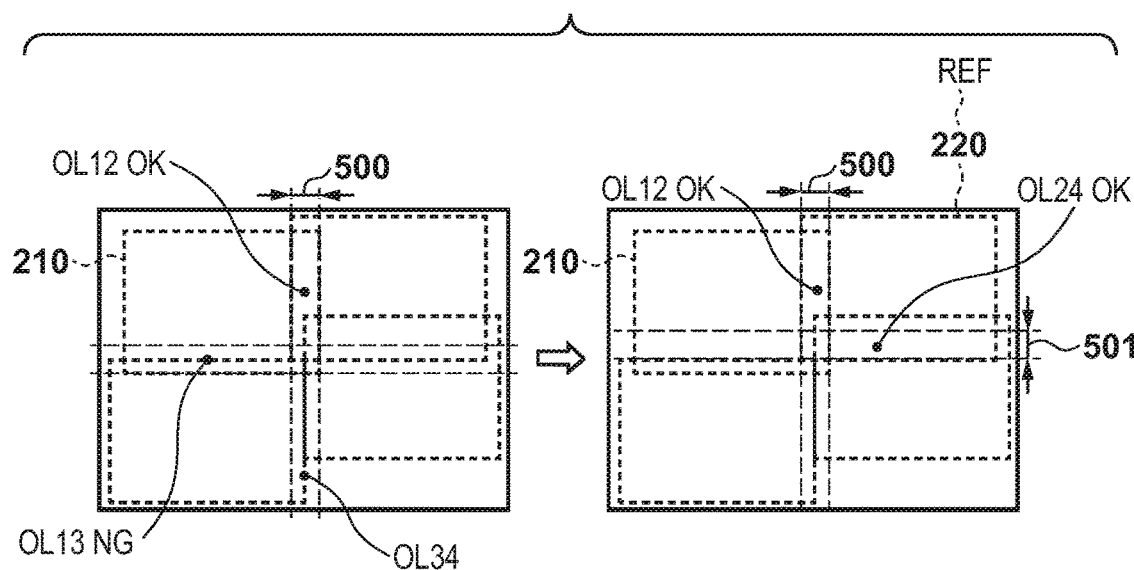

In FIG. 7B, OL12 is an overlap portion between the projection images 210 and 220, OL13 is an overlap portion between the projection images 210 and 230, OL24 is an overlap portion between the projection images 220 and 240, and OL34 is an overlap portion between the projection images 230 and 240. In the top-left projection image 210, which is a starting point of the scanning, the overlap portion OL12 satisfies the overlap requirement, but the overlap portion OL13 does not satisfy the overlap requirement. Thus, the next projection image 220 is scanned. In the projection image 220, since both the overlap portions OL12 and OL24 satisfy the overlap requirements, the projector 22 that projects the projection image 220 is determined to be a reference projector.

Figure 7C:
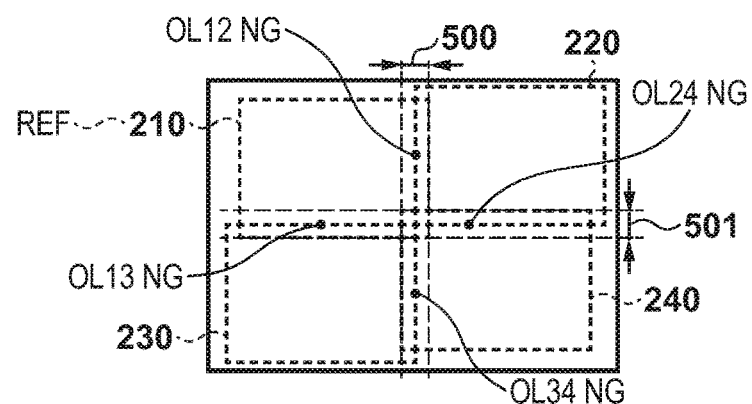

However, there is a case in which no projection image exists that includes both the overlap portions in the horizontal direction and the vertical direction that satisfy the overlap requirements. This example is illustrated in FIG. 7C. Here, none of the overlap portions OL12, OL13, OL24, and OL34 satisfies the overlap requirement. In this case, according to the priority in the scanning order, the projector 21 that projects the top-left projection image 210, which is the starting point of the scanning, is determined to be a reference projector.

Further, there is also a case in which each of the projection images includes the overlap portion either in the horizontal or vertical direction that satisfies the overlap requirement. This example is illustrated in FIG. 7D. When the scanning is started in the order illustrated in FIG. 7A, it becomes clear that each of the projection images includes only one of the overlap portions that satisfies the overlap requirement. In this case also, similarly to the case illustrated in FIG. 7C, according to the priority in the scanning order, the projector 21 that projects the top-left projection image 210, which is the starting point of the scanning, is determined to be a reference projector.

Figure 8A:
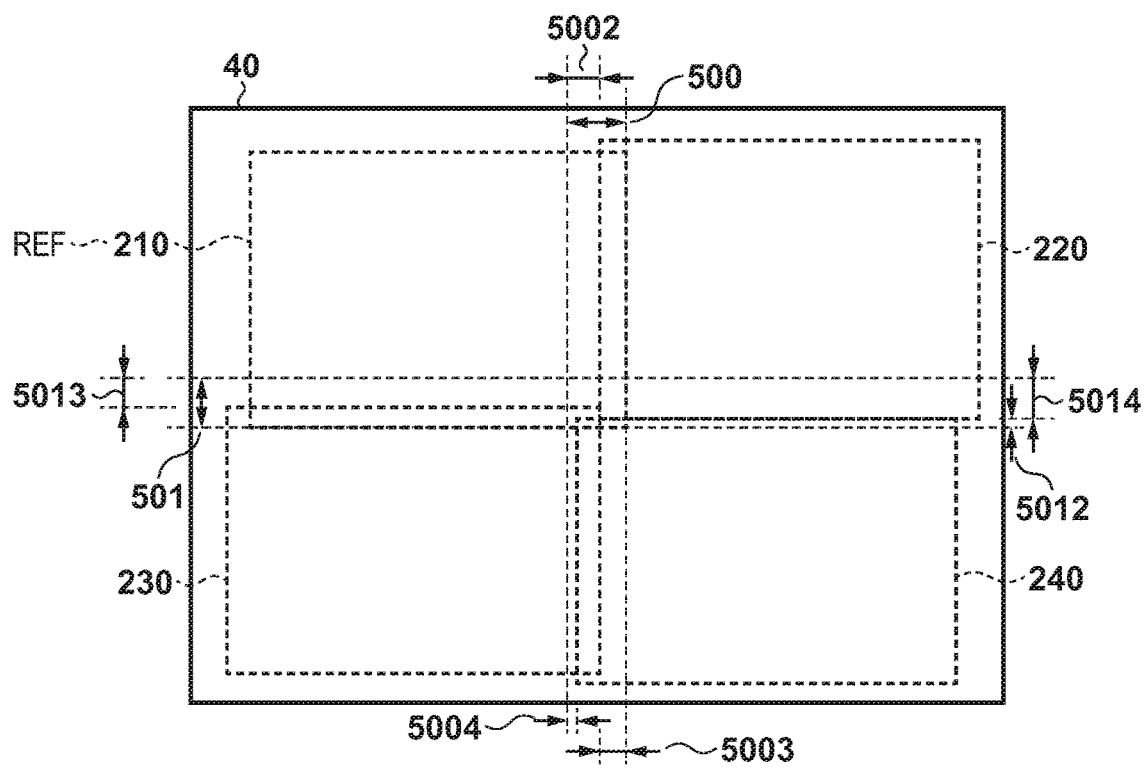
FIG. 8A and FIG. 8B are diagrams illustrating the calculated adjustment amounts.
Figure 8B:
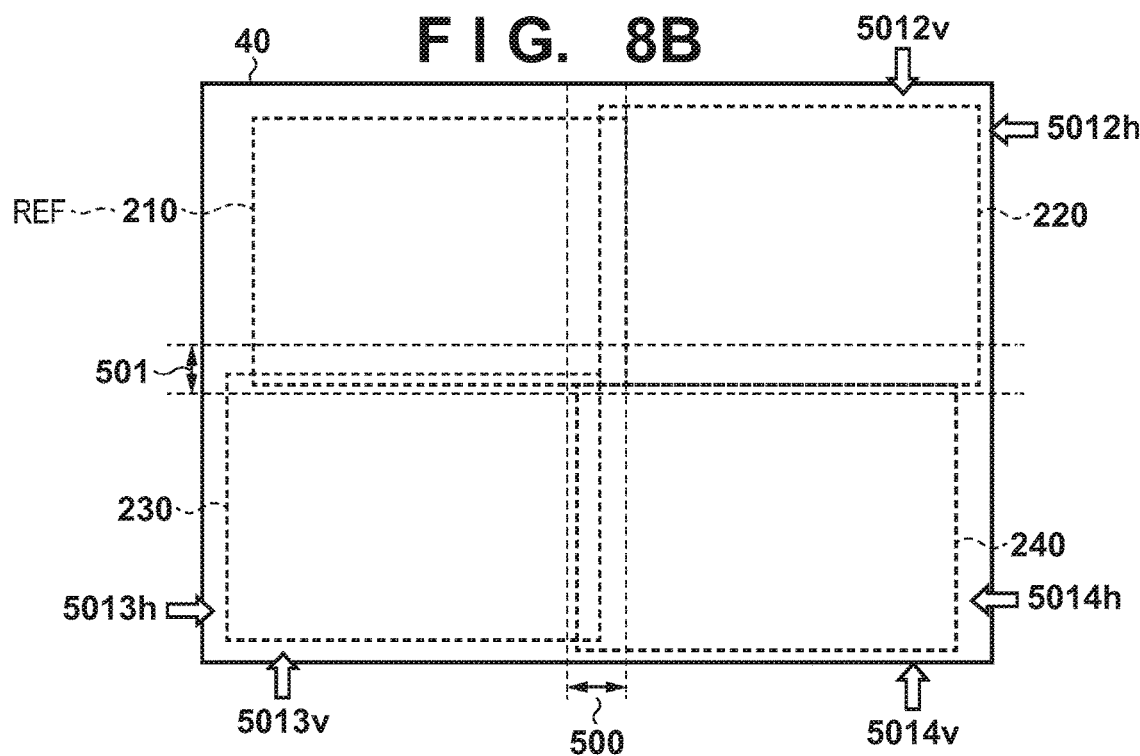

FIG. 8A and FIG. 8B are diagrams illustrating calculated adjustment amounts. In FIG. 8A and FIG. 8B, the projection images 210 to 240 on which the keystone correction has been performed are illustrated. When the sides of the projection image 210 of the reference projector 21 are used as references, the projectors 22 to 24 may be moved such that each of the projection images overlap each other in the overlap requirement region that has the overlap widths 500 and 501 as illustrated in FIG. 8A and FIG. 8B.

Specifically, with respect to the projector 22 that projects the projection image 220, an adjustment length 5012 is obtained for a vertical direction 5012v, and an adjustment length 5002 is obtained for a horizontal direction 5012h. Similarly, with respect to the projector 23 that projects the projection image 230, an adjustment length 5013 is obtained for a vertical direction 5013v, and an adjustment length 5003 is obtained for a horizontal direction 5013h. Further, with respect to the projector 24 that projects the projection image 240, an adjustment length 5014 is obtained for a vertical direction 5014v, and an adjustment length 5004 is obtained for a horizontal direction 5014h.

Then, the adjustment indicators are generated on the basis of these adjustment lengths and adjustment directions.

With the above-described processing, in the first embodiment, the adjustment indicator, which guides the positional alignment of each of the projectors such that the overlap requirements for the edge blending are satisfied, is presented to the user by the display control apparatus. As a result, the user can easily perform the positional alignment of the projectors while visually referencing the adjustment indicator.

Second Embodiment

In the first embodiment, an example is described in which an arrow is used as the adjustment indicator. Another example is described in a second embodiment.

FIG. 9A to FIG. 9D are diagrams illustrating an example of the adjustment indicator according to the second embodiment. In FIG. 9A to FIG. 9D, the projection images 210 to 240 on which the keystone correction has not been performed are projected onto the screen 40. Note that the projection images on which the keystone correction has been performed may be projected. Further, the projector 21 that projects the projection image 210 is determined to be a reference projector. In FIG. 9A, adjustment indicators 1610, 1221, 1231, and 1241 are projected in a central section of the screen 40 while being superimposed on the projection images 210, 220, 230, and 240, respectively. Note that the keystone correction has been performed on the adjustment indicators. In addition, a reference indicator 1600, which is formed in a 2×2 matrix pattern, is also projected onto the projection image 210, which is used as a reference. The user moves the projectors 22 to 24 in accordance with the adjustment indicators 1221, 1231, and 1241 such that a graphic formed by the adjustment indicators 1610, 1221, 1231, and 1241 has the same shape as that of the reference indicator 1600. Specifically, the graphic formed by the adjustment indicators 1610, 1221, 1231, and 1241, which are projected by the projectors 22 to 24 that have been moved to the guided positions (correct positions), has the same shape as that of the reference indicator 1600.

The indicator generation unit 16 generates the adjustment indicators 1221, 1231, and 1241, to which arrows are added for aligning the positions thereof to the position of the adjustment indicator 1610 that is used as a reference, on the basis of the adjustment lengths in the horizontal and vertical directions and the adjustment directions, which are calculated by the adjustment amount calculation unit 14. Note that the arrow indicates the adjustment direction by the direction thereof, and indicates the adjustment amount by the length thereof. Note that since the adjustment amounts can be ascertained by the adjustment indicators 1221, 1231, and 1241, the arrow may be provided simply for the purpose of indicating the adjustment direction. Note that the arrow may be formed in a mode described in the first embodiment (adjustment indicators 221, 231, and 241). Further, the display of the indicators that indicate the adjustment amounts may be omitted, and only the graphic used for forming the same shape as that of the reference indicator 1600 may be displayed.

FIG. 9B is an example in which a reference indicator 2600 is formed in a 4×4 matrix pattern. By changing a degree of the matrix in accordance with the accuracy required for the positional alignment, the user can also visually perform a high-accuracy positional alignment.

In FIG. 9C and FIG. 9D, numbers are added to the reference indicator and the adjustment indicators illustrated in FIG. 9A and FIG. 9B. As a result, the user can more intuitively keep track of the positions to which the adjustment indicators should be moved, and thus can even more easily perform the positional alignment. Note that illustrations of the arrows are omitted in FIG. 9C and FIG. 9D.

Third Embodiment

Figure 10:
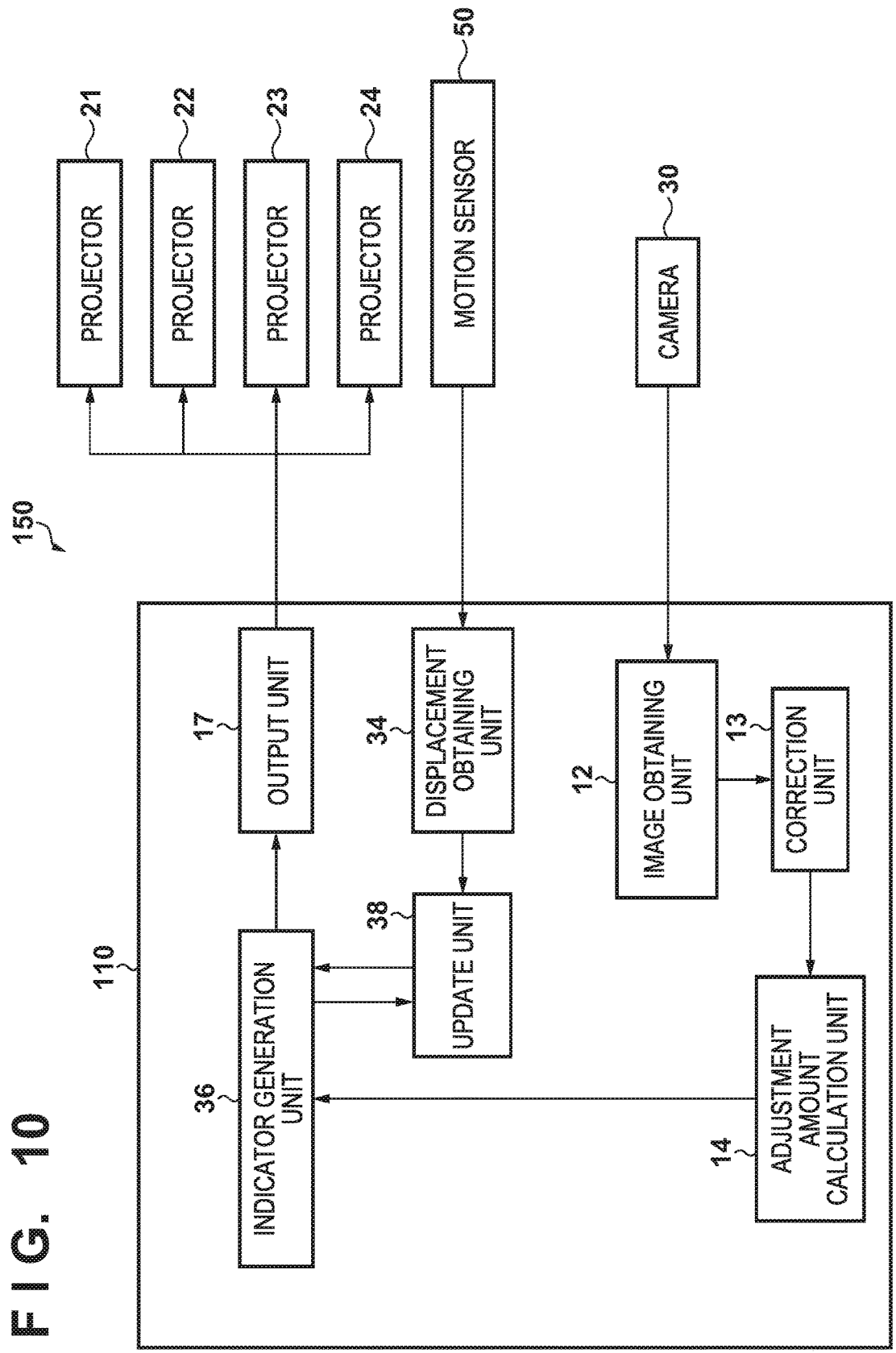
FIG. 10 is a functional block diagram of a PC 110.

FIG. 10 is a functional block diagram of a PC 110 according to a third embodiment. An image projection system 150 according to the third embodiment generates the adjustment indicator in real time by feeding back a positional displacement of each of the projectors. The PC 110 is provided with an indicator generation unit 36 instead of the indicator generation unit 16 of the PC 10 according to the first embodiment, a displacement obtaining unit 34, and an update unit 38. Since other functional blocks are identical with those of the PC 10 according to the first embodiment, the descriptions thereof are omitted.

The displacement obtaining unit 34 obtains the positional displacement of each of the projectors 21 and 22 from a motion sensor 50 that detects the positional displacement. The motion sensor 50 may be provided in advance in each of the projectors 21 to 24, or may be attached as an external device.

The update unit 38 obtains the current adjustment length and adjustment direction from the indicator generation unit 36. Then, on the basis of the current adjustment length and adjustment direction, and the displacement obtained by the displacement obtaining unit 34, the update unit 38 determines whether each of the projectors is in the guided position (correct position). When it is determined that the projector is not in the correct position, the update unit 38 updates the adjustment direction and the adjustment length on the basis of the obtained displacement such that the adjustment direction and the adjustment length correspond to the current position of the projector, and outputs the information to the indicator generation unit 36. On the other hand, when it is determined that the projector is in the correct position, the update unit 38 instructs the indicator generation unit 36 to end the generation of the adjustment indicator. Accordingly, the projection of the adjustment indicator from each of the projectors 21 to 24 is complete.

The indicator generation unit 36 newly generates an adjustment indicator on the basis of the updated adjustment length and adjustment direction, and transmits the new adjustment indicator to the output unit 17.

Figure 11A:
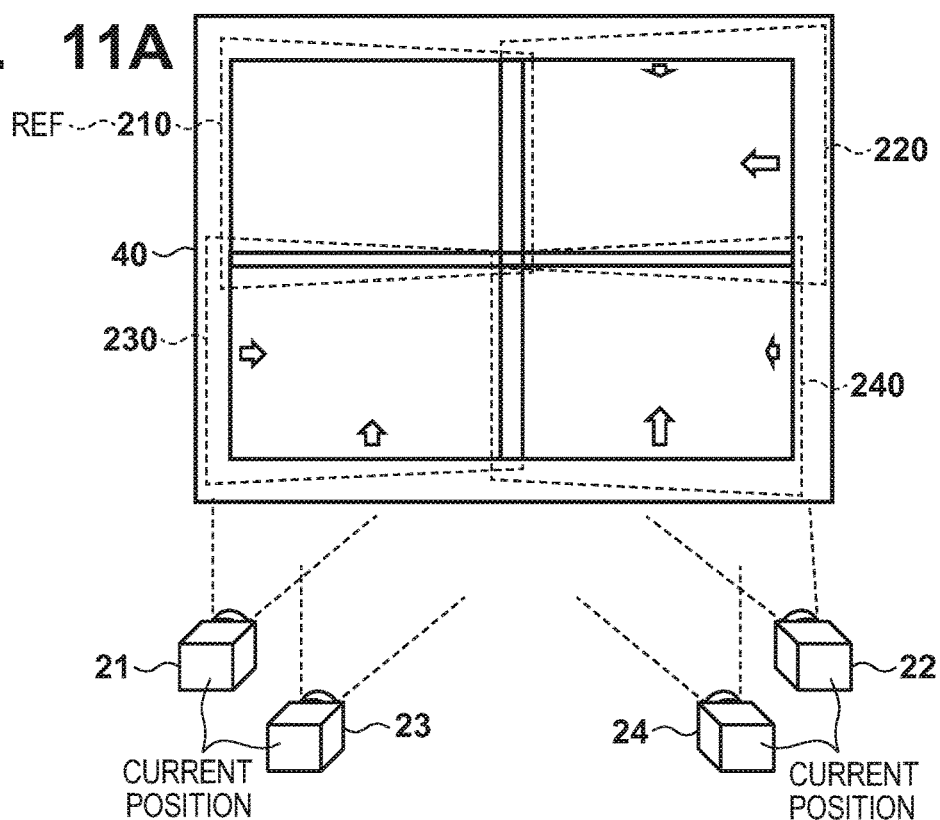
FIG. 11A and FIG. 11B are diagrams illustrating an image projection system 150 before and after positional alignment.
Figure 11B:
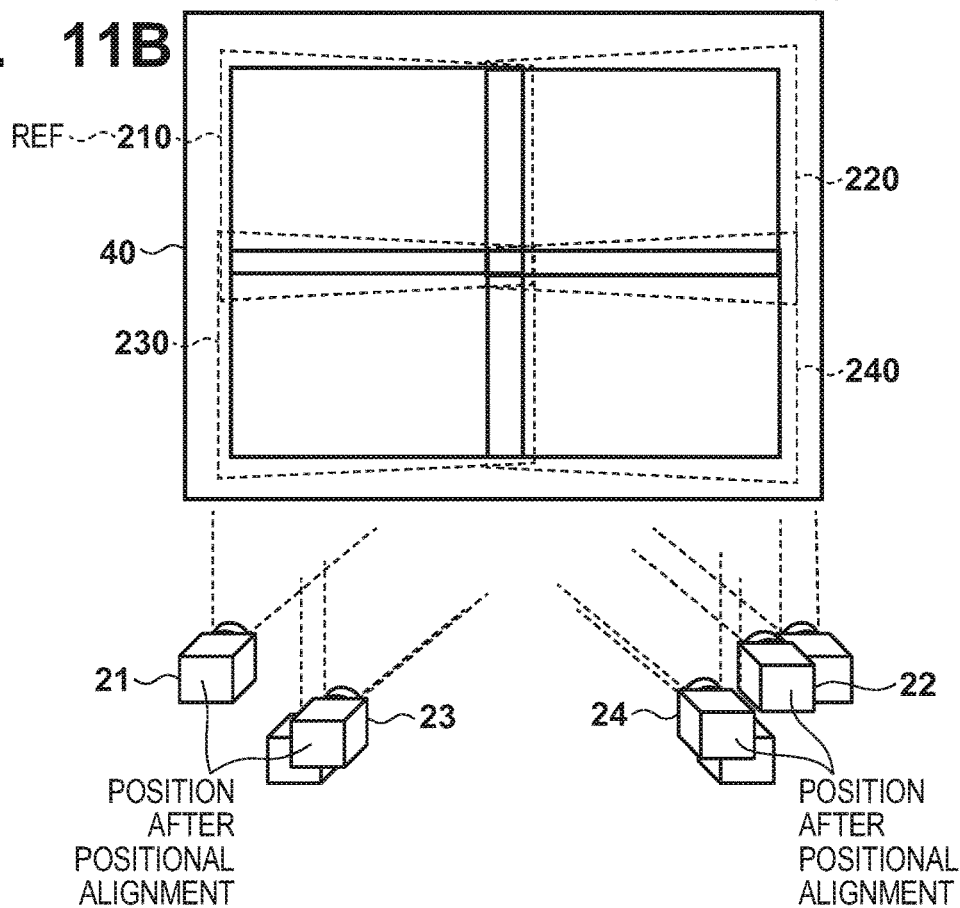

FIG. 11A and FIG. 11B are diagrams illustrating the image projection system 150 before and after the positional alignment. FIG. 11A illustrates the (current) projection images 210 to 240 before the positional alignment, and the projectors 21 to 24. On the screen 40, the adjustment indicators are projected using the projector 21 as a reference.

FIG. 11B illustrates a state obtained after the positional alignment. When the displacement obtained by the motion sensor 50 (not illustrated) is reflected on the display of the adjustment indicator in real time, and the positional alignment is properly complete, the display of the adjustment indicator ends.

Figure 12:
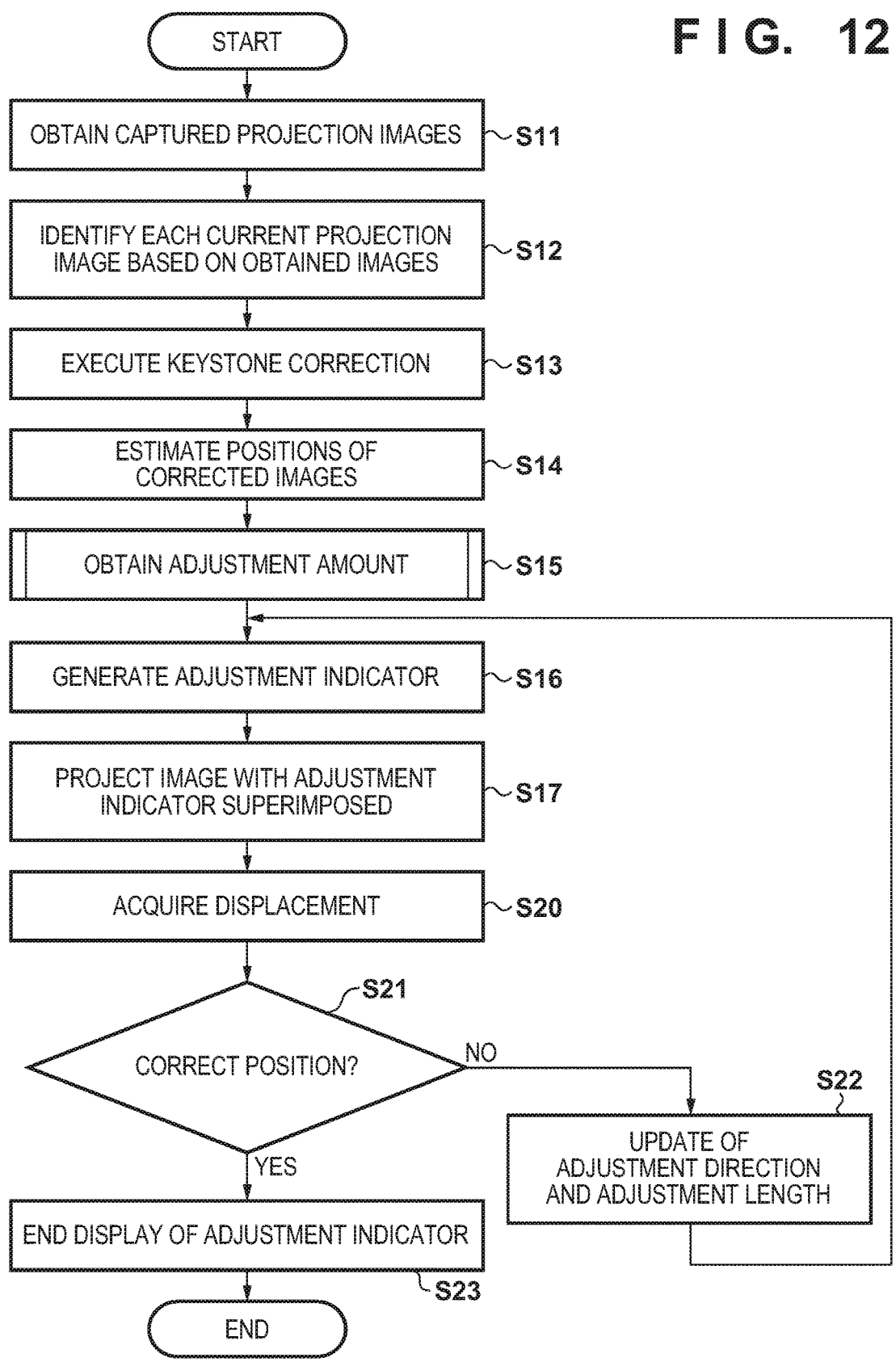
FIG. 12 is a flowchart illustrating processing for determining an adjustment direction and an adjustment length according to the second embodiment.

FIG. 12 is a flowchart illustrating processing for determining the adjustment direction and the adjustment length according to the third embodiment. Since processing in steps S11 to S17 is identical with the processing described in FIG. 6, the description thereof is omitted.

In step S20, the displacement obtaining unit 34 obtains the displacement of each of the projectors from the motion sensor 50, and transmits the displacement to the update unit 38.

In step S21, the update unit 38 determines whether each of the projectors is in the correct position on the basis of the current adjustment length and adjustment direction and the obtained displacement. Note that the update unit 38 may determine that each of the projectors is in the "correct position," when the position of each of the projectors is within a predetermined range from the position guided by the adjustment indicator.

When it is determined that the projector is not in the correct position (No in step S21), in step S22, the update unit 38 updates the adjustment direction and the adjustment length on the basis of the obtained displacement. Then, on the basis of the updated adjustment direction and adjustment length, the indicator generation unit 36 generates the adjustment indicator once again in step S16.

On the other hand, when it is determined that each of the projectors is in the correct position (Yes in step S21), in step S23, the update unit 38 instructs the indicator generation unit 36 to end the generation of the adjustment indicator so as to end the processing.

With the above-described processing, in the third embodiment, the adjustment indicator is generated on the basis of the feedback on the movement of each of the projectors. As a result, the user can confirm the adjustment indicator for which the current position of the projector is reflected, and can thus perform the positional alignment more quickly and accurately.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005944, filed Jan. 17, 2018 which is hereby incorporated by reference herein in its entirety.

What is claimed is:

1. A display control apparatus that displays a single image by causing a plurality of projection images projected in a projection target region by a plurality of projection devices arranged in different positions to overlap each other by a predetermined overlap width, the display control apparatus comprising:
a setting unit configured to set a target overlap width with respect to an overlap region, in which at least two of adjacent projection images of the plurality of projection images overlap each other;
an image obtaining unit configured to obtain a captured image obtained by capturing the plurality of projection images projected in the projection target region;
a calculation unit configured to calculate the overlap width of the overlap region of the at least two adjacent projection images on the basis of the captured image; and
an indicator generation unit configured to generate, on the basis of the overlap width, an adjustment indicator that guides a positional adjustment of the projection image such that the at least two adjacent projection images overlap each other by the target overlap width.

2. The apparatus according to claim 1, further comprising: an adjustment amount calculation unit configured to calculate an adjustment direction and an adjustment length for the guiding on the basis of the overlap width, wherein
the indicator generation unit generates the adjustment indicator on the basis of the adjustment direction and the adjustment length.

3. The apparatus according to claim 2, further comprising: a correction unit configured to correct distortion of the captured plurality of projection images, wherein
the adjustment amount calculation unit calculates the adjustment direction and the adjustment length on the basis of the corrected projection images.

4. The apparatus according to claim 2, wherein
the adjustment amount calculation unit determines, using one of the plurality of projection devices as a reference, one of or both of horizontal and vertical directions in which other projection devices are moved, as the adjustment direction.

5. The apparatus according to claim 2, wherein
the adjustment amount calculation unit calculates, as the adjustment length, a distance by which the projection device is moved such that the projection image thereof overlaps an adjacent projection image by the overlap width.

6. The apparatus according to claim 2, further comprising:
a displacement obtaining unit configured to obtain a displacement of positions of the plurality of projection devices; and
an update unit configured to update the adjustment direction and the adjustment length on the basis of the obtained displacement, wherein
the indicator generation unit generates the adjustment indicator on the basis of the updated adjustment direction and adjustment length.

7. The apparatus according to claim 6, wherein
when the update unit determines that the plurality of projection images are in positions due to the guiding on the basis of the obtained displacement, the update unit instructs the indicator generation unit to end generation of the adjustment indicator.

8. The apparatus according to claim 1, wherein
the indicator generation unit further generates a reference indicator, and
the adjustment indicators projected by the plurality of projection devices form a graphic corresponding to the reference indicator when the plurality of projection images overlap each other by the predetermined overlap width.

9. The apparatus according to claim 8, wherein
the indicator generation unit determines one of the plurality of projection devices to be a reference projection device, and causes the reference projection device to project the reference indicator.

10. The apparatus according to claim 9, further comprising: an adjustment amount calculation unit configured to calculate, on the basis of the captured plurality of projection images, an adjustment direction and an adjustment length for performing the guiding using the projection image projected by the reference projection device as a reference, wherein
the adjustment indicator includes an indicator that indicates the adjustment direction and the adjustment length.

11. The apparatus according to claim 1, further comprising: an output unit configured to output the generated adjustment indicator to the plurality of projection devices, wherein
the generated adjustment indicator is displayed while being superimposed on a projection image provided by a corresponding projection device.

12. The apparatus according to claim 1, wherein
the calculation unit calculates the overlap width of each of the overlap regions in the plurality of projection images, and
the indicator generation unit generates a plurality of adjustment indicators that guide positional adjustment of the projection images such that the plurality of projection images overlap each other by the target overlap width.

13. The apparatus according to claim 12, wherein
the indicator generation unit generates the plurality of adjustment indicators of different sizes in accordance with the overlap width.

14. The apparatus according to claim 1, wherein
the indicator generation unit generates the adjustment indicator formed in an arrow shape.

15. An image projection system comprising:
a plurality of projection devices arranged in different positions;
an image capturing device configured to capture a plurality of projection images projected in a projection target region by the plurality of projection devices;
a setting unit configured to set a target overlap width with respect to an overlap region in which at least two of adjacent projection images of the plurality of projection images overlap each other;
an image obtaining unit configured to obtain a captured image obtained by capturing the plurality of projection images projected in the projection target region;
a calculation unit configured to calculate the overlap width of the overlap region of the at least two adjacent projection images on the basis of the captured image; and
an indicator generation unit configured to generate, on the basis of the overlap width, an adjustment indicator that guides a positional adjustment of the projection image such that the at least two adjacent projection images overlap each other by the target overlap width.

16. The image projection system according to claim 15, further comprising: an adjustment amount calculation unit configured to calculate an adjustment direction and an adjustment length for the guiding on the basis of the overlap width, wherein
the indicator generation unit generates the adjustment indicator on the basis of the adjustment direction and the adjustment length.

17. A control method for a display control apparatus that controls to display a single image by causing a plurality of projection images projected in a projection target region by a plurality of projection devices arranged in different positions to overlap each other by a predetermined overlap width, the control method comprising:
setting a target overlap width with respect to an overlap region in which at least two of adjacent projection images of the plurality of projection images overlap each other;
obtaining a captured image obtained by capturing the plurality of projection images projected in the projection target region;
calculating the overlap width of the overlap region of the at least two adjacent projection images on the basis of the captured image; and
generating, on the basis of the overlap width, an adjustment indicator that guides a positional adjustment of the projection image such that the at least two adjacent projection images overlap each other by the target overlap width.

18. The control method according to claim 17, further comprising: calculating an adjustment direction and an adjustment length for the guiding on the basis of the overlap width, wherein
the adjustment indicator is generated on the basis of the adjustment direction and the adjustment length.

19. A non-transitory computer readable storage medium that stores a program causing a computer to execute a control method for a display control apparatus that displays a single image by causing a plurality of projection images projected in a projection target region by a plurality of projection devices arranged in different positions to overlap with each other by a predetermined overlap width, the control method comprising:
setting a target overlap width with respect to an overlap region in which at least two of adjacent projection images of the plurality of projection images overlap each other;
obtaining a captured image obtained by capturing the plurality of projection images projected in the projection target region;
calculating the overlap width of the overlap region of the at least two adjacent projection images on the basis of the captured image; and
generating, on the basis of the overlap width, an adjustment indicator that guides a positional adjustment of the projection image such that the at least two adjacent projection images overlap each other by the target overlap width.

20. The computer-readable storage medium according to claim 19, wherein
the control method further comprises:
calculating an adjustment direction and an adjustment length for the guiding on the basis of the overlap width, and
the adjustment indicator is generated on the basis of the adjustment direction and the adjustment length.

* * * * *